April 6, 1954
E. A. MALICK
2,674,091
PULSE JET ENGINE
Filed Aug. 5, 1948
3 Sheets-Sheet 1
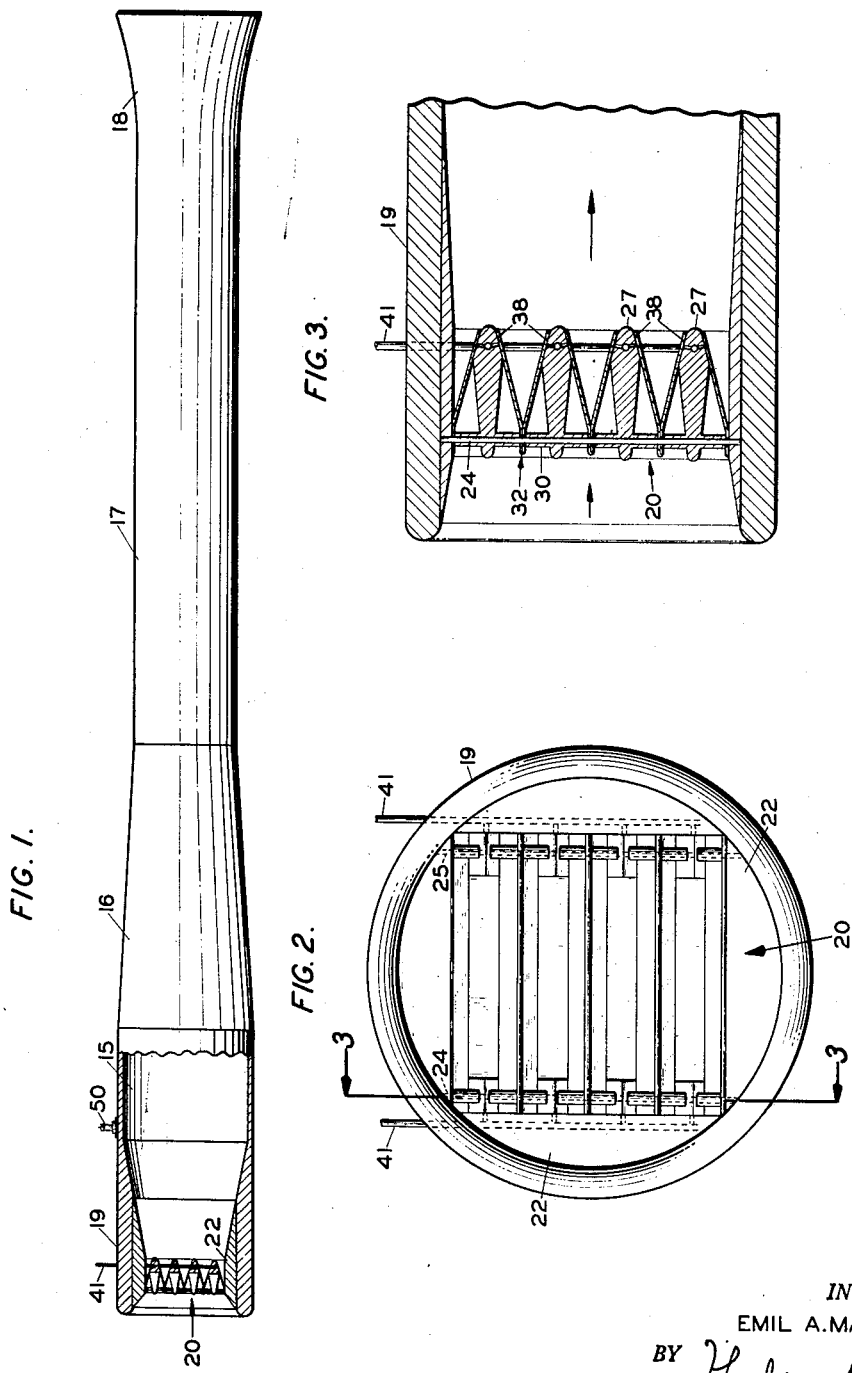
INVENTOR.
EMIL A. MALICK
BY Hudson & Young
ATTORNEYS April 6, 1954  E. A. MALICK  2,674,091
PULSE JET ENGINE Filed Aug. 5, 1948  3 Sheets-Sheet 2

INVENTOR.
EMIL A. MALICK
BY *Hudson & Young*
ATTORNEYS

April 6, 1954  E. A. MALICK  2,674,091
PULSE JET ENGINE

Filed Aug. 5, 1948  3 Sheets-Sheet 3

INVENTOR.
EMIL A. MALICK
BY Hudson & Young
ATTORNEYS

Patented Apr. 6, 1954

2,674,091

UNITED STATES PATENT OFFICE 2,674,091

PULSE JET ENGINE

Emil A. Malick, Bartlesville, Okla., assignor to Phillips Petroleum Company, a corporation of Delaware Application August 5, 1948, Serial No. 42,552

29 Claims. (Cl. 60—39.77)

This invention relates to pulse jet engines. In another aspect, it relates to a valve assembly for such engines.

Pulse jet engines ordinarily include a combustion chamber, an exhaust pipe, a bank of valves, sometimes identified as flapper valves or reeds, means for injecting fuel into the engine, and a spark plug or other source of ignition. The valve arrangement is such as to permit flow of air into the combustion chamber but to prevent flow of air or combustion gases in a reverse direction from the combustion chamber through the valve bank. The valves generally consist of thin metal plates which, in their closed position, contact valve seats and, in operation, the valves close and open rapidly, much in the manner of a vibrating reed. In certain engines, the fuel is admitted upstream of the valve bank while, in others, it is admitted a short distance behind the valve bank or laterally thereof. In all such engines of which I am aware, the means for fuel injection includes nozzles or jets which are not closed by the valves and which release a continuous flow of fuel.

In many cases, there has been a tendency for the valves to bounce on their seats upon closure, thereby hastening failure of the valves. This may be due to the impact with which the valves strike their seats, or it may be partially due to the presence of high frequency transient pressure waves. Some manufacturers have resorted to the use of a soft rubber coating upon the valve seats and, in certain experimental applications, upon the valves themselves, which in effect absorb the valve seat loadings and thereby prolong the valve life. Coupled with impact fatigue, there is the known deleterious influence of flame or high gas temperatures upon the valves. This effect is also partially reduced by the use of a rubber coating on the valve seat since, by providing a better sealing surface, such coatings retard the movement of flame in the direction of the valves. For the same purpose, some designs utilize a heat shield to absorb much of the heat which might otherwise be imposed on the valve itself.

Another effect believed to exist consists of rolling of the valve along its longitudinal axis during seating. For example, the middle of the valve may seat first, with subsequent seating rapidly progressing from the center to the edges and this may be followed by one or more similar oscillations occasioned by the bouncing effect previously mentioned. Such an effect would be expected to produce high stresses near the end corners of the valves, since the tendency of the valve to close along its entire surface under these circumstances might be resisted by a pronounced bending moment in the opposite direction, particularly near the end corners. This partial explanation of failure is somewhat substantiated by the observations that many failures initially appear at the end corners of the valves. Here again, the use of a soft cushioning coating is of some advantage.

In those cases where the fuel is admitted upstream of the valve bank, it will be apparent that, during the period of closure of the valves, the admission of the fuel into the combustion chamber is prevented, thereby making the admission of both fuel and air intermittent and dependent upon valve movement. By virtue of the open fuel nozzles incorporated in all such engines of which I am aware, fuel continues to flow out of the nozzles into the region upstream of the valve bank even during the period when the valves are closed. Where fuel is admitted downstream from the valve bank, the flow of fuel into the combustion chamber is not restricted by the valve movement and, assuming that the pressure in the combustion chamber does not exceed that in the fuel lines, a continuous fuel flow exists throughout the entire combustion cycle. Since the flow of air is restricted by the valves, it will be apparent that the mixture itself varies over a wide range of fuel-air ratios, both before and during the combustion period.

It is an object of the invention to provide a jet engine and valve assembly therefor to attain more efficient operation, improved fuel economy and effective cooling of the valve and valve seats.

It is a further object of the invention to provide such a jet engine and valve assembly therefor in which a cushioning effect is imparted to the valves upon closure, together with means for facilitating the opening movement of the valves.

It is a still further object of the invention to provide a structure for improving atomization and distribution of fuel into the engine, and to provide a substantially constant fuel-air ratio.

It is a still further object of the invention to provide a valve assembly for a jet engine which is of durable construction, rugged in operation, and which can be manufactured at low cost.

Various other objects, advantages and features of the invention will become apparent from the following detailed description taken in conjunction with the accompanying drawings, in which:

Figure 1 is a front elevational view, partially in section, of a jet engine constructed in accordance with the present invention;

Figure 2 is an enlarged end view of the engine shown by Figure 1;

Figure 3 is an enlarged view of the valve assembly shown by Figure 1, being a section on the line 3—3 of Figure 2;

Figure 4:
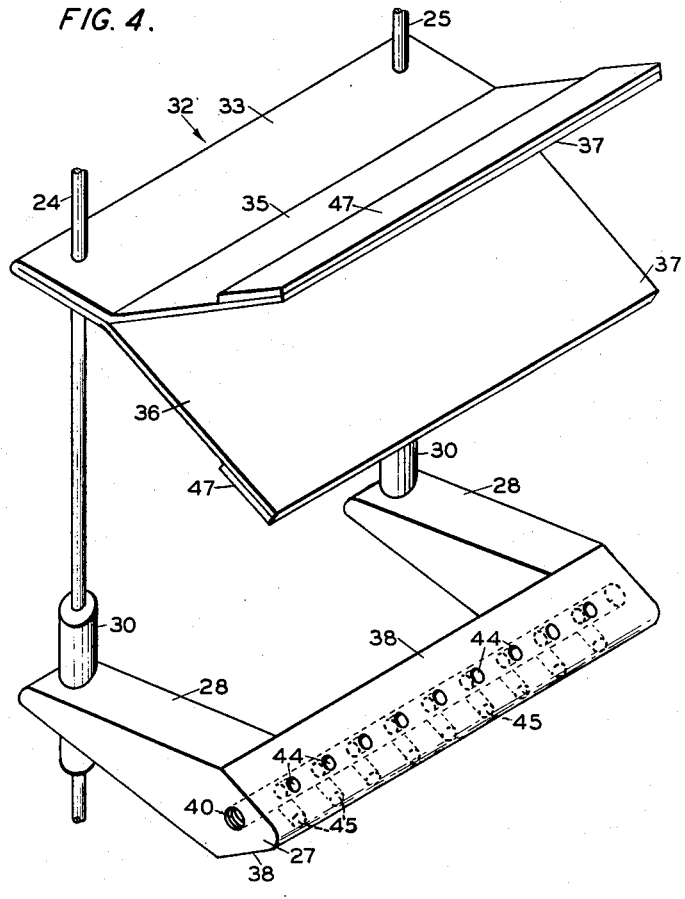
Figure 4 is a perspective view of a portion of the valve assembly with the parts in disassembled relation.

Referring now to the drawings in detail, Figures 1 to 5, inclusive, the novel valve assembly is mounted in a jet engine comprising a combustion chamber 15 defined by a tapered generally cylindrical tube 16. The outlet portion of the combustion chamber communicates with an elongated cylindrical exhaust portion 17 terminating in a tail portion 18. An inlet assembly 19 of reduced cross section communicates with the inlet passage of combustion chamber 16 and this inlet portion carries a novel valve assembly generally indicated by reference numeral 20. The assembly 20 is disposed in a plane generally perpendicular to the flow of air through the engine and said assembly is of generally rectangular cross section, the regions or spaces between the tubular inlet portion 19 and the valve assembly being occupied by cowling 22.

A pair of parallel spaced metal rods 24, 25 are firmly secured to the tubular portion 19 and these rods, in turn, support the valve assembly 20. As will be clearly apparent from Figures 4 and 5, the valve assembly comprises a plurality of elongated valve seat bodies 27 which are formed from metal and have a generally triangular cross section. Each body 27 has a pair of supporting legs 28 integrally formed therewith and these legs are provided with holes through which extend the rods 24 and 25. Referring to Figure 3, it will be noted that the valve seat bodies carried by the rods are in parallel spaced formation and they are held in such position by spacers 30 and the valves to be hereinafter described.

A valve 32 is mounted midway between each pair of valve seats by the spacers 30 and each valve is formed from a thin sheet of flexible metal which is folded to form a hinge portion 33 defined by a double thickness of metal, this hinge portion having holes formed therein for receiving the supporting rods 24 and 25. A pair of reeds or flapper portions 35, 36 diverge from the hinged portion 33 and the free end 37 of each flapper portion is adapted to engage a flat valve seat 38 on the adjacent body 27. Accordingly, each triangular body has two seats 38 which define an acute angle and which are engaged by the flapper portions of the two valves adjacent thereto. Thus, in the embodiment of the invention illustrated by Figure 3, there are four valve seat bodies and the three intermediate valves on the assembly each have two reed or flapper portions engaging the seats 38 on the two bodies. The end valves have only a single reed, and the hinge portion of these outer valves is formed from a single thickness of metal rather than a double thickness. It is also to be understood that, while only four valve seats are shown in the described embodiment of the invention, a greater or lesser number may be used as desired depending upon the power requirements and size of the jet engine.

Figure 5:
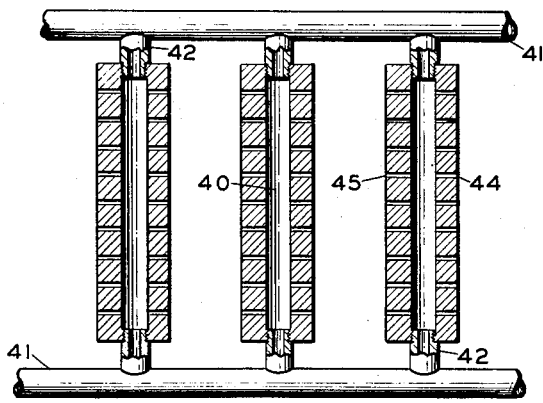
Figure 5 is a schematic view of the fuel inlet.

Each of the elongated bodies 38 has a longitudinal fuel conduit 40 extending therethrough and these conduits communicate with common fuel supply lines 41 through nipples 42, Figure 5.

Fuel under pressure is supplied to the lines 41 from any suitable source, not shown. Communicating with each conduit 40 is a set of ports 44 which lead from the conduit to one of the valve seats and a similar set of ports 45 connects said conduit 40 with the other valve seat. It will be apparent that the ports 44, 45 are closed when the end of the valve engages the seat and that these ports are opened when said parts are disengaged from each other.

Each flapper portion 35, 36 is provided with a coating 47 of resilient material which is adapted for engagement with the entire flat surfaces of the adjacent valve seat when the valve is in closed position.

The operation of the disclosed embodiment of the invention will now be apparent to those skilled in the art. Assuming that a charge of fuel and air is present within combustion chamber 15 and that the valves 32 are open, operation of a spark plug 50, Figure 1, detonates the charge with the result that the burning gases flow rearwardly and are ejected through the exhaust portion 18, thereby providing a useful forward reaction or thrust. The pressure wave resulting from combustion of the fuel mixture causes the flapper portions 35, 36 to engage the respective seats 38 and close the valves. As the burning gases pass outwardly through the flared portion 18, the pressure within the combustion chamber decreases and, due to the inertia of the gases, eventually falls below atmospheric pressure. Thereupon, air is forced inwardly through the inlet portion 19 to the combustion chamber, thereby opening the valves 32 and causing the flapper portions 35, 36 to be disengaged from the valve seats. Responsive to the opening of the valves, fuel flows through the ports 44, 45 and is mixed with the air entering the combustion chamber, thereby introducing a second charge into the chamber which is ignited. During operation of the engine, the valves open and close rapidly, much in the manner of a vibrating reed, and after firing of the original charge, operation of the spark plug is no longer necessary, in the case of many existing pulse jet engines, to ignite the fuel gases.

It will be noted that the disclosed structure offers a number of important advantages over jet engines wherein fuel is continuously mixed with the air either in the combustion chamber or at regions forwardly of the valve bank. First, the pressure of the initial flow of fuel through the ports 44, 45 against the valves facilitates the opening movement thereof while the force of the fuel streams provides a cushioning action as the valves move toward closed position. In this connection, it will be noted that the design of the valves and seats is such that the fuel issuing from the ports is dispersed over a large area of the valves. This cushioning action, in combination with the cushioning effect of the resilient coatings 47, largely eliminates bouncing of the valves through reduction of the impact load thereon during closure and greatly reduces the effects of high frequency transient pressure waves. The cushioning effects also tend to prevent rolling of the valve along its longitudinal axis during seating and, if desired, the size of the ports 44, 45, may be varied along the valve structure, thereby to further minimize uneven seating of the valve. It is also desirable, in some cases, to mix a small proportion of oil with the fuel to provide an additional cushion (as set forth in the copending application of S. C. Britton and R. M. Schirmer, Serial No. 794,427, filed December 29, 1947) effect upon closure of the valves. Further, the fuel discharged from the ports cools the valve upon engagement therewith and a portion of the fuel stream is reflected upon the valve seats thereby providing cooling for these parts. The heat transfer between the hot valve and seat and the fuel aids in the atomization of the fuel, as does the high degree of turbulence and mixing caused by the angular relation between the stream of air flowing into the engine through inlet passage 19 and the stream of fuel flowing at an acute angle thereto through the ports 44 and 45.

The intermittent closing of the ports 44, 45 by engagement of the flapper portions 35, 36 with the valve seat provides a nearly constant fuel-air ratio in the mixture which flows to the combustion chamber. This results from the fact that the flow of fuel occurs only during periods when air is being admitted to the combustion chamber and, when the flow of air is stopped, the flow of fuel is likewise stopped by the closing movement of the valves. Thus, there is no accumulation of fuel either upstream or downstream from the valve bank when the flow of air is stopped, as was the case with jet engines previously utilized wherein there was a continuous flow of fuel at all times.

Figure 6:
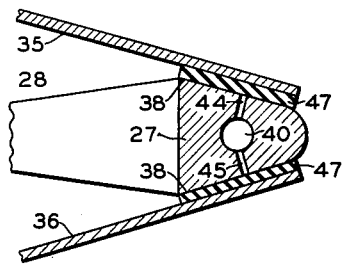
Figures 6 to 11 are sectional views showing several alternative constructions of the valves and valve seat.

The valve structure already described is shown in cross section by Figure 6 from which it will be noted that the ports 44, 45 are generally perpendicular to the surfaces 38. This arrangement provides a maximum cushioning action since the fuel flows through the ports in a direction generally perpendicular to the valve surfaces.

Figure 7:
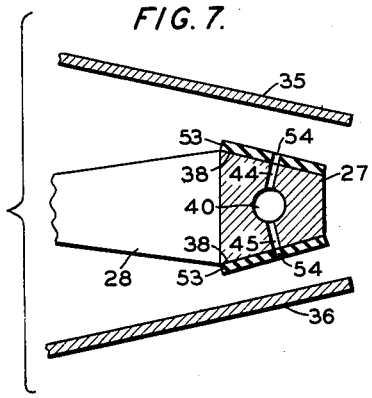

The modification of the invention shown by Figure 7 is similar to that of Figure 6 except that a coating 53 of resilient material is secured to the valve seats and the coating 47 is omitted from the flapper portions 35 and 36. The coatings 53 are provided with openings 54 which register with the ports 44 and 45. This structure affords the same advantages as that of Figure 6 and may be used in engines where it is not desired to provide loading of the ends of the flapper portions by the resilient coatings.

Figure 8:
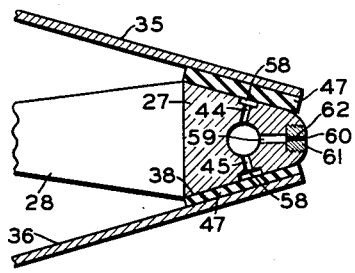

Referring now to Figure 8, I have disclosed a structure which is generally similar to that of Figure 6 except that each of the ports 44, 45 has a counter-bored portion 58 at its outer end. During the period when the valve is closed, these counter-bored portions are partially or completely filled with liquid fuel. This permits a large accumulation of fuel to be discharged into the engine during the initial opening movement of the valve, and cooling of a relatively large area of the valve. The counter-bored portions also tend to prevent an accumulation of gum or other solid material at the open ends of the fuel ports. In addition, rapid opening of the valve is facilitated since the force due to fuel pressure is transmitted to a relatively large area of the valve. In this modification, I have also provided a series of ports, one of which is shown at 59, communicating with conduit 40 and opening at the rounded surface 52 of the valve seat. Each port 59 may have a screw threaded counter-bored portion 60 at its outer end and a plug or nozzle 61 may be screw threaded into this counter-bored portion, such plug having a very small central passage 62 which forms the fuel passing through the port into a jet. It will be noted that this arrangement provides a continuous jet of fuel which is directed into the combustion chamber at all times and which may be of advantage to aid in ignition of the fuel-air charge.

Figure 9:
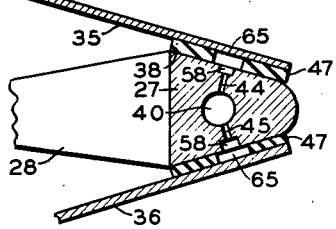

In the modification of Figure 9, the ports 59 are omitted and the coatings 47 on the flapper portions 35, 36 are provided with counter-bored portions 65 registering with the counter-bored portions 58 formed in the valve seat adjacent the outer ends of ports 44 and 45. The portions 65 perform the same function as the counter-bored portions 58 and, in certain cases, it may be desirable to provide the counter-bores both in the resilient material and in the valve seat, as shown, while, in other cases, it may be desirable to provide counter-bored portions only in the resilient material 47 or, alternatively, only in the valve seat, as shown by Figure 8.

Figure 10:
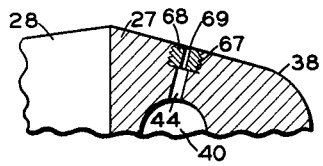

In Figure 10, I have shown a modified valve seat body in which each of the ports 44, 45 is provided with an internally threaded counter-bored portion 67 opening at the surface 38. A plug 68 is threaded in the counter-bored portion 67 and this plug has a very small central opening 69 for directing the fuel flowing through the ports 44, 45 into a jet formation. This structure is advantageous where it is desired that the fuel leave the fuel orifice at high velocity and provides a very localized cushioning action. Further, in testing engines, it is desirable to vary the size of the openings in ports 44, 45 or even to close some of them completely and this may readily be accomplished by using plugs 68 with openings of different diameters or even by using solid plugs.

Figure 11:
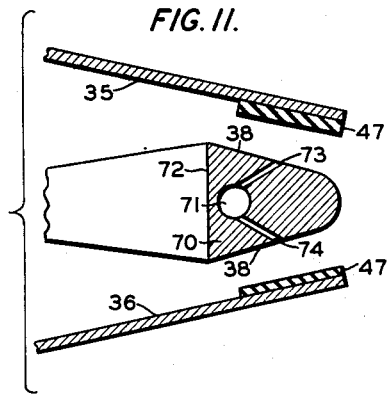

Referring now to Figure 11, I have shown a modified valve seat body 70 in which there is a longitudinal fuel conduit 71 closely spaced to the inner edge 72, rather than at the center of the valve seat body, as in the preceding modifications. Two sets of ports 73, 74 permit fuel to flow from conduit 71 to outlets at the surfaces 38. It will be noted that ports 73, 74 define an acute angle with the surfaces 38 and are not perpendicular thereto, as are the ports 44, 45 of the preceding figures. That is, the ports 73, 74 function as scarfed tubes and cause the fuel to be directed from the ports co-currently with the flow of air passing into the engine. In this manner, the flow of fuel tends to draw air from the inlet portion into the combustion chamber, thereby aiding engine efficiency by permitting in some designs a greater amount of air to be drawn in each time the valves are opened.

In some cases, the counter-bored portions of Figures 8, 9 and 10 may consist of gutters extending the whole length of the valve seat and such gutters may be formed either in the coatings of the valve or valve seat, or in the metal of the valve or valve seat itself. The ports 44, 45 may be replaced by thin slits extending the whole length of the body or valve seat. Finally, various changes in the size and shape of the valves and seats may be made without departing from the spirit and scope of the invention.

While the invention has been described in connection with present, preferred embodiments thereof, it is to be understood that this description is illustrative only and is not intended to limit the invention, the scope of which is defined by the appended claims.

Having described my invention, I claim:

1. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a plurality of elongated valve seat assemblies disposed in parallel formation in a plane perpendicular to the axis of the combustion chamber, the downstream portion of each valve seat assembly being constructed and arranged to define two inclined surfaces converging toward the downstream end of the assembly and defining equal angles with a plane parallel to the axis of the combustion chamber and coinciding with the axis of the elongated valve seat assembly, a longitudinal fuel conduit extending through each valve seat assembly, and two sets of longitudinally spaced ports formed in each assembly, said sets of ports connecting the longitudinal conduit with the respective inclined surfaces at the downstream portion of the valve seat, a common supply line for all of said conduits, a valve unit mounted between each pair of valve seats, each unit comprising a single thin flexible metal plate bent to form a unit of V-shaped cross section with two flapper portions diverging from the center of the plate, the outer ends of the flapper portions being engageable with the respective adjacent inclined surfaces of the valve seats and closing the ports therein when the flapper portions are in such engaged position, and a coating of resilient material mounted between each flapper portion and the associated valve seat.

2. The combination of claim 1 wherein each coating of resilient material is mounted upon the associated flapper portion and is adapted to engage the surface of the adjacent valve seat.

3. The combination of claim 1 wherein each coating of resilient material is mounted upon the surface of the associated valve seat engageable by a flapper portion, each coating of resilient material having a series of openings formed therein registering within the ports in the valve seat.

4. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a plurality of elongated valve seat assemblies disposed in parallel formation in a plane perpendicular to the axis of the combustion chamber, the downstream portion of each valve seat assembly being constructed and arranged to define two inclined surfaces converging toward the downstream end of the assembly and defining equal angles with a plane parallel to the axis of the combustion chamber and coinciding with the axis of the elongated valve seat assembly, a longitudinal fuel conduit extending through each valve seat assembly, and two sets of longitudinally spaced ports formed in each assembly, said sets of ports connecting the longitudinal conduit with the respective inclined surfaces at the downstream portion of the valve seat, said valve seat being constructed and arranged to form a counter-bored portion at the outer end of each port adjacent the surface of the valve seat so as to provide a reservoir of fuel, a common supply line for all of said conduits, a valve unit mounted between each pair of valve seats, each unit comprising a single thin flexible metal plate bent to form a unit of V-shaped cross section with two flapper portions diverging from the center of the plate, the outer ends of the flapper portions being engageable with the respective adjacent inclined surfaces of the valve seats and closing the ports therein when the flapper portions are in such engaged position, fuel being discharged from each reservoir when the associated flapper is moved away from the valve seat, and a coating of resilient material mounted upon each flapper portion and adapted to engage the adjacent surface of a valve seat and close an associated counter-bored portion therein.

5. The combination of claim 4 wherein each coating has a counterbored portion disposed directly above the counter-bored portion of each port in the series of ports formed in the associated valve seat.

6. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a plurality of elongated valve seat assemblies disposed in parallel formation in a plane perpendicular to the axis of the combustion chamber, the downstream portion of each valve seat assembly being constructed and arranged to define two inclined surfaces converging toward the downstream end of the assembly and defining equal angles with a plane parallel to the axis of the combustion chamber and coinciding with the axis of the elongated valve seat assembly, a longitudinal fuel conduit extending through each valve seat assembly, and two sets of longitudinally spaced ports formed in each assembly, said sets of ports connecting the longitudinal conduit with the respective inclined surfaces at the downstream portion of the valve seat, each valve seat being shaped to form a series of openings communicating with the associated fuel supply conduit and extending rearwardly in a direction parallel to the axis of the combustion chamber, a threaded metal insert secured within the rearward end of each opening, said insert having an axial passage formed therein of relatively small size as compared to the size of said opening, a common supply line for all of said conduits, and a valve unit mounted between each pair of valve seats, each unit comprising a single thin flexible metal plate bent to form a unit of V-shaped cross section with two flapper portions diverging from the center of the plate, the outer ends of the flapper portions being engageable with the respective adjacent inclined surfaces of the valve seats and closing the ports therein when the flapper portions are in such engaged position.

7. The combination of claim 6 wherein a coating of resilient material is secured to each flapper portion and engageable with the flat surface of the adjacent valve seat, each port in the valve seat having a counter-bored portion adjacent the surface of the valve seat.

8. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a plurality of elongated valve seat assemblies disposed in parallel formation in a plane perpendicular to the axis of the combustion chamber, the downstream portion of each valve seat assembly being constructed and arranged to define two inclined surfaces converging toward the downstream end of the assembly and defining equal angles with a plane parallel to the axis of the combustion chamber and coinciding with the axis of the elongated valve seat assembly, a longitudinal fuel conduit extending through each valve seat assembly, and two sets of longitudinally spaced ports formed in each assembly, said sets of ports connecting the longitudinal conduit with the respective inclined surfaces at the downstream portion of the valve seat, each valve seat being constructed and arranged to form an interiorly screw threaded counter-bored portion adjacent the surface of the valve seat, a threaded metal insert fitting within each counter-bored portion, and an axial passage formed in said insert, said passage being of smaller diameter than the adjacent valve port, a common supply line for all of said conduits, and a valve unit mounted between each pair of valve seats, each unit comprising a single thin flexible metal plate bent to form a unit of V-shaped cross section with two flapper portions diverging from the center of the plate, the outer ends of the flapper portions being engageable with the respective adjacent inclined surfaces of the valve seats and closing the ports therein when the flapper portions are in such engaged position.

9. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a plurality of elongated valve seat assemblies disposed in parallel formation in a plane perpendicular to the axis of the combustion chamber, the downstream portion of each valve seat assembly being constructed and arranged to define two inclined surfaces converging toward the downstream end of the assembly and defining equal angles with a plane parallel to the axis of the combustion chamber and coinciding with the axis of the elongated valve seat assembly, a longitudinal fuel conduit extending through each valve seat assembly, and two sets of longitudinally spaced ports formed in each assembly, said sets of ports connecting the longitudinal conduit with the respective inclined surfaces at the downstream portion of the valve seat, said ports defining scarfed tubes extending rearwardly to the valve seat and defining an acute angle with respect to the axis of the combustion chamber, a common supply line for all of said conduits, a valve unit mounted between each pair of valve seats, each unit comprising a single thin flexible metal plate bent to form a unit of V-shaped cross section with two flapper portions diverging from the center of the plate, the outer ends of the flapper portions being engageable with the respective adjacent inclined surfaces of the valve seats and closing the ports therein when the flapper portions are in such engaged position, and a coating of resilient material secured to each flapper portion and adapted to engage the adjacent surface of a valve seat thereby to close the associated scarfed tubes.

10. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, a plurality of elongated valve seat bodies arranged in parallel formation and extending transversely of said inlet passage, means securing said valve seat bodies to said valve assembly, each valve seat having a fuel conduit extending longitudinally therethrough and each having two sets of longitudinally spaced ports communicating with said conduits and the respective sides of said valve seat, a common supply line for all of said conduits, a valve unit mounted between each pair of valve seat bodies, each valve unit being formed from a single thin flexible metal plate, the ends of said plate being bent over to form a hinge portion of generally planar configuration defined by a double thickness of metal, means securing said hinge portions in position upon the valve assembly so that they are disposed parallel to said valve seat bodies, the ends of said plate diverging from said hinge portion as two flapper portions defining a unit of generally V-shaped cross section, the outer ends of said flapper portions being engageable with the respective valve seat bodies and closing the ports therein when the flapper portions are in such engaged position, and a coating of resilient material mounted between each flapper portion and the associated valve seat.

11. The combination of claim 10 wherein each coating of resilient material is mounted upon the associated flapper portion and is adapted to engage the surface of the adjacent valve seat.

12. A combination of claim 10 wherein each coating of resilient material is mounted upon the surface of the associated valve seat engageable by a flapper portion, each coating of resilient material having a series of openings formed therein registering with the ports of the valve seat.

13. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, a plurality of elongated valve seat bodies arranged in parallel formation and extending transversely of said inlet passage, means securing said valve seat bodies to said valve assembly, each valve seat having a fuel conduit extending longitudinally therethrough and each having two sets of longitudinally spaced ports communicating with said conduits and the respective sides of said valve seat, said valve seat being constructed and arranged to form a counter-bored portion at the outer end of each port adjacent the surface of the valve seat so as to provide a reservoir of fuel, a common supply line for all of said conduits, a valve unit mounted between each pair of valve seat bodies, each valve unit being formed from a single thin flexible metal plate, the ends of said plate being bent over to form a hinge portion of generally planar configuration defined by a double thickness of metal, means securing said hinge portions in position upon the valve assembly so that they are disposed parallel to said valve seat bodies, the ends of said plate diverging from said hinge portion as two flapper portions defining a unit of generally V-shaped cross section, the outer ends of said flapper portions being engageable with the respective valve seat bodies and closing the ports therein when the flapper portions are in such engaged position, fuel being discharged from each reservoir when the associated flapper portion is moved away from the valve seat, and a coating of resilient material mounted upon each flapper portion and adapted to engage the adjacent surface of a valve seat and close an associated counter-bored portion therein.

14. The combination of claim 13 wherein each coating has a counter-bored portion disposed directly above the counter-bored portion of each port in the series of ports formed in the associated valve seat.

15. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, a plurality of elongated valve seat bodies arranged in parallel formation and extending transversely of said inlet passage, means securing said valve seat bodies to said valve assembly, each valve seat having a fuel conduit extending longitudinally therethrough and each having two sets of longitudinally spaced ports communicating with said conduits and the respective sides of said valve seats, each valve seat being shaped to form a series of openings communicating with the associated fuel supply conduit and extending rearwardly in a direction parallel to the axis of the combustion chamber, a threaded metal insert secured within the rearward end of each opening, said insert having an axial passage formed therein of relatively small size as compared to the size of said opening, a common supply line for all of said conduits, and a valve unit mounted between each pair of valve seat bodies, each valve unit being formed from a single thin flexible metal plate, the ends of said plate being bent over to form a hinge portion of generally planar configuration defined by a double thickness of metal, means securing said hinge portions in position upon the valve assembly so that they are disposed parallel to said valve seat bodies, the ends of said plate diverging from said hinge portion as two flapper portions defining a unit of generally V-shaped cross section, the outer ends of said flapper portions being engageable with the respective valve seat bodies and closing the ports therein when the flapper portions are in such engaged position.

16. The combination of claim 15 wherein a coating of resilient material is secured to each flapper portion and engageable with the flat surface of the adjacent valve seat, each port in the valve seat having a counter-bored portion adjacent the surface of the valve seat.

17. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, a plurality of elongated valve seat bodies arranged in parallel formation and extending transversely of said inlet passage, means securing said valve seat bodies to said valve assembly, each valve seat having a fuel conduit extending longitudinally therethrough and each having two sets of longitudinally spaced ports communicating with said conduits and the respective sides of said valve seat, each valve seat being constructed and arranged to form an interiorly screw threaded counter-bored portion adjacent the surface of the valve seat, a threaded metal insert fitting within counter-bored portion, and an axial passage formed in said insert, said passage being of smaller diameter than the adjacent valve port, a common supply line for all of said conduits, and a valve unit mounted between each pair of valve seat bodies, each valve unit being formed from a single thin flexible metal plate, the ends of said plate being bent over to form a hinge portion of generally planar configuration defined by a double thickness of metal, means securing said hinge portions in position upon the valve assembly so that they are disposed parallel to said valve seat bodies, the ends of said plate diverging from said hinge portion as two flapper portions defining a unit of generally V-shaped cross section, the outer ends of said flapper portions being engageable with the respective valve seat bodies and closing the ports therein when the flapper portions are in such engaged position.

18. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, a plurality of elongated valve seat bodies arranged in parallel formation and extending transversely of said inlet passage, means securing said valve seat bodies to said valve assembly, each valve seat having a fuel conduit extending longitudinally therethrough and each having two sets of longitudinally spaced ports communicating with said conduits and the respective sides of said valve seat, said ports defining scarfed tubes extending rearwardly of the valve seat and defining an acute angle with respect to the axis of the combustion chamber, a common supply line for all of said conduits, a valve unit mounted between each pair of valve seat bodies, each valve unit being formed from a single thin flexible metal plate, the ends of said plate being bent over to form a hinge portion of generally planar configuration defined by a double thickness of metal, means securing said hinge portions in position upon the valve assembly so that they are disposed parallel to said valve seat bodies, the ends of said plate diverging from said hinge portion as two flapper portions defining a unit of generally V-shaped cross section, the outer ends of said flapper portions being engageable with the respective valve seat bodies and closing the ports therein when the flapper portions are in such engaged position, and a coating of resilient material secured to each flapper portion and adapted to engage the adjacent surface of a valve seat thereby to close the respective scarfed tubes.

19. In a jet engine, in combination, a generally cylindrical combustion chamber having an inlet passage and an outlet passage, a valve assembly mounted in said inlet passage in a plane generally perpendicular to the axis of said combustion chamber and the direction of air flow through said engine, said valve assembly including a pair of parallel spaced metal rods disposed in a plane perpendicular to the axis of said combustion chamber, a plurality of elongated valve seats carried by said rods, each valve seat including a pair of legs secured to the respective rods and a body portion extending between the legs downstream of said rods and generally perpendicular thereto, each valve seat having a fuel conduit extending longitudinally therethrough and each having two sets of longitudinally spaced ports communicating with said conduits and the respective sides of said valve seat, a common supply line for all of said conduits and a valve unit mounted between each pair of valve seats, each valve unit being formed from a single thin flexible metal plate, the ends of said plate being bent over to form a hinge portion of generally planar configuration defined by a double thickness of metal and extending transversely of said rods, each hinge portion having holes formed therein for mounting the valve unit on said rod, each valve having two flapper portions diverging from said hinge portion to form a unit of V-shaped cross section, the outer ends of said flapper portions being engageable with the respective adjacent valve seats and closing the ports therein when the flapper portions are in such engaged position, and a set of spacer members on said rods between adjacent valve units and valve seats.

20. The combination of claim 19 wherein a coating of resilient material is mounted between each flapper portion and the associated valve seat.

21. The combination of claim 19 wherein a coating of resilient material is mounted upon each flapper portion and is adapted to engage the surface of the adjacent valve seat.

22. The combination of claim 19 wherein a coating of resilient material is mounted upon each surface of the valve seat engageable by a flapper portion, said coating of resilient material having a series of openings formed therein registering with the ports in the valve seat.

23. The combination of claim 19 wherein each port has a counter-bored portion adjacent the surface of the valve seat so as to provide a reservoir of fuel which is discharged when the flapper is moved away from the valve seat.

24. The combination of claim 19 wherein a coating of resilient material is mounted upon each flapper portion and is adapted to engage the adjacent surface of a valve seat, each coating having a counter-bored portion disposed directly above each port in the series of ports formed in the valve seat.

25. The combination of claim 19 wherein a coating of resilient material is mounted upon each flapper portion and is adapted to engage the adjacent surface of a valve seat, each coating having a counter-bored portion disposed directly above each port in the series of ports formed in the valve seat, and each port having a counter-bored portion adjacent the surface of the valve seat.

26. The combination of claim 19 wherein each valve seat is provided with a series of openings communicating with the associated fuel supply conduit and extending rearwardly in a direction parallel to the axis of the combustion chamber, each last-mentioned opening having a threaded metal insert at the rearward end thereof, said insert having an axial passage formed therein of relatively small size as compared to the size of said opening.

27. The combination of claim 19 wherein each valve seat is provided with a series of openings communicating with the associated fuel supply conduit and extending rearwardly in a direction parallel to the axis of the combustion chamber, each last-mentioned opening having a threaded metal insert at the rearward end thereof, said insert having an axial passage formed therein of relatively small size as compared to the size of said opening, and a coating of resilient material secured to each flapper portion and engageable with the flat surface of the adjacent valve seat, each port in the valve seat having a counter-bored portion adjacent the surface of the valve seat.

28. The combination of claim 19 wherein each port has a counter-bored portion adjacent the surface of the valve seat, each counter-bored portion being interiorly screw threaded, a threaded metal insert fitting within said counter-bored portion, and an axial passage formed in said insert, said passage being of smaller diameter than the adjacent valve port.

29. The combination of claim 19 wherein the ports in the valve seat define scarfed tubes extending rearwardly of the valve seat and defining an acute angle with respect to the axis of the combustion chamber, and a coating of resilient material secured to each flapper portion and adapted to engage the adjacent surface of a valve seat thereby to close the recited scarfed tubes.

References Cited in the file of this patent

UNITED STATES PATENTS

| Number | Name | Date |
|---|---|---|
| 1,625,787 | Braselton | Apr. 26, 1927 |
| 1,632,198 | Ritter | June 14, 1927 |
| 1,959,068 | Stoll | May 15, 1934 |
| 2,142,601 | Bleecker | Jan. 3, 1939 |
| 2,432,213 | Rutishauser | Dec. 9, 1947 |
| 2,505,757 | Dunbar et al. | May 2, 1950 |

OTHER REFERENCES

U. S. Navy Project "Squid," Technical Memorandum No. Pr. 4, "The Aero-Resonator Power Plant of the V-1 Flying Bomb," by Ing. Guenther Diedrich, June 30, 1948, Princeton University, page 58, Fig. 87.